Dec. 4, 1973  K. INGHAM  3,776,794
REINFORCED FLEXIBLE HOSE AND METHOD
OF MANUFACTURING SAME
Filed April 28, 1971  2 Sheets-Sheet 1
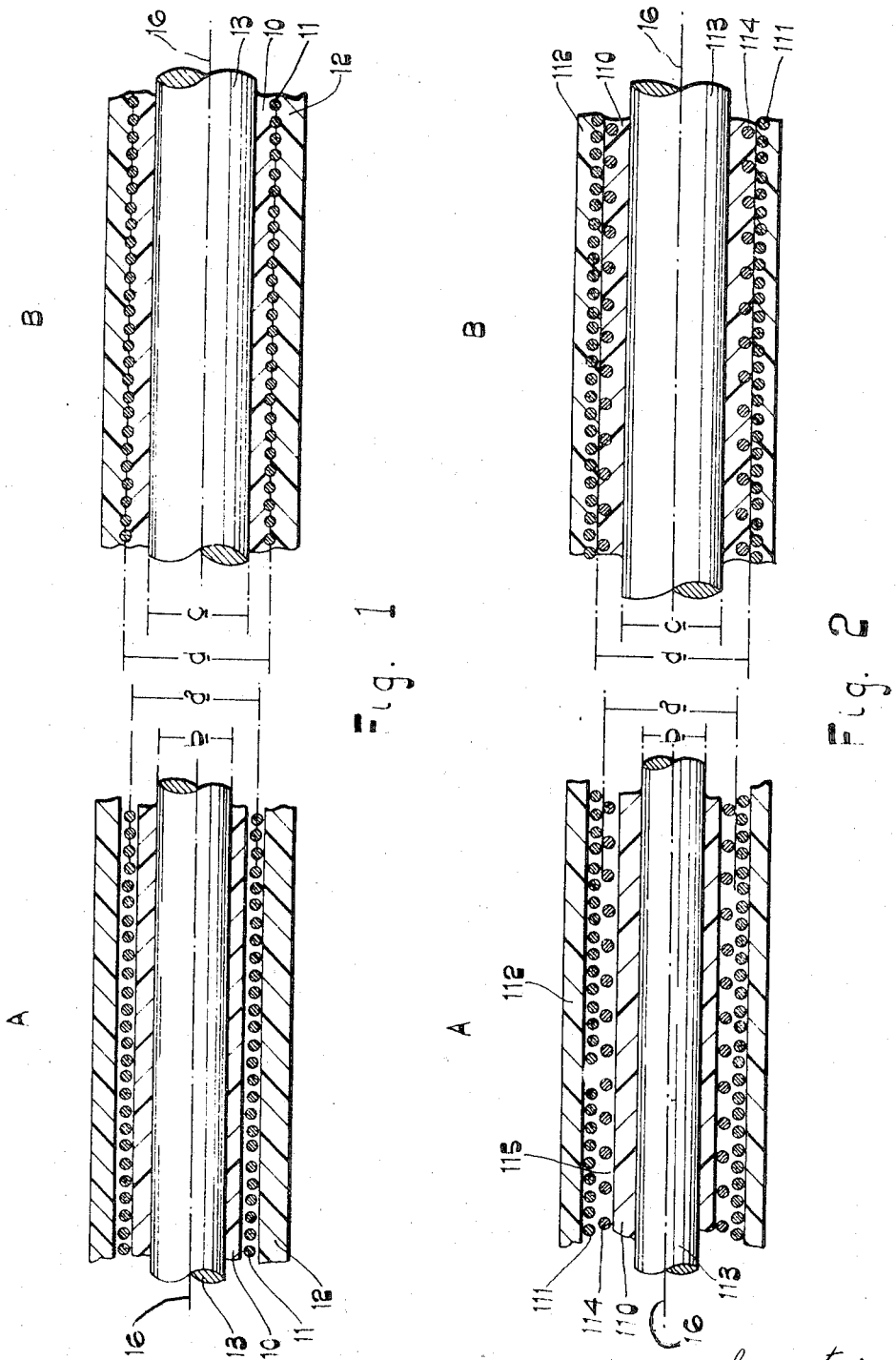

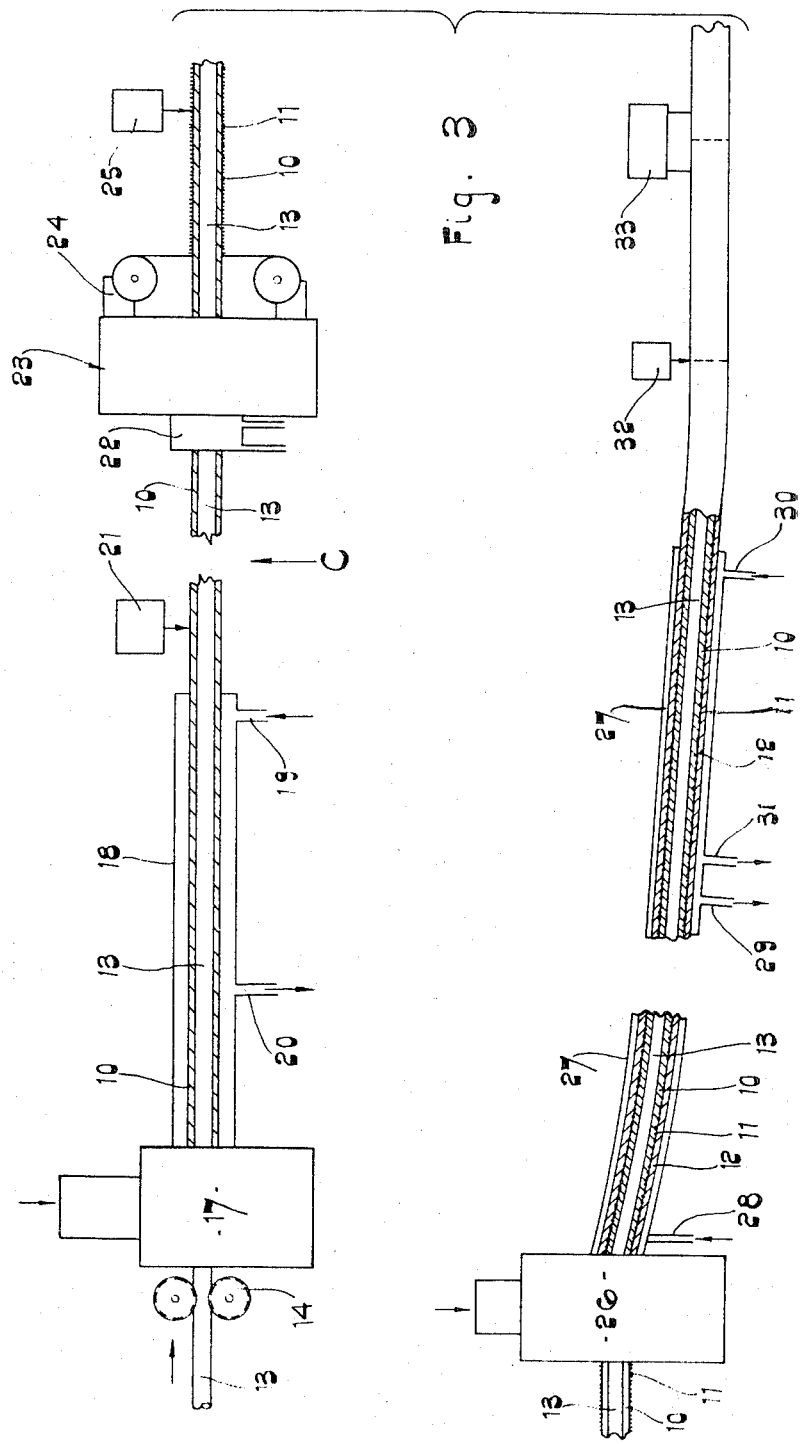

United States Patent Office 3,776,794
Patented Dec. 4, 1973

3,776,794
REINFORCED FLEXIBLE HOSE AND METHOD
OF MANUFACTURING SAME
Kenneth Ingham, Stainsacre, England, assignor to
Winster Hose Limited, Ilkeston, England
Filed Apr. 28, 1971, Ser. No. 138,261
Claims priority, application Great Britain, Apr. 28, 1970,
20,262/70
Int. Cl. B29h 7/14
U.S. Cl. 156—143                                   11 Claims

ABSTRACT OF THE DISCLOSURE

Flexible reinforced hose is manufactured by extruding curable material onto a mandrel to form a tubular inner part of the hose, applying a wire reinforcement about the inner part, extruding a further layer of curable material about the reinforcement to form a tubular outer part. The assembly is then heated to cure the inner and outer parts simultaneously, with the assembly supported as a catenary during an initial part of the curing treatment to avoid imparting a non-rectilinear set to the hose. The respective co-efficients of thermal expansion of the mandrel and of the reinforcement are such that mandrel expands radially relative to the reinforcement as the assembly is heated, with the result that material from the inner part is forced into interstices in the reinforcement and a closely embracing and surface keying relation is established between the reinforcement and the inner part of the hose.

BACKGROUND OF THE INVENTION

The invention relates to a method of manufacturing flexible hose and to the structure of the hose itself.

The invention is applicable to flexible hose comprising a flexible tubular inner part made of a non-metallic curable material which is embraced by a reinforcing member formed of filamentary material. Ordinarily, such hose will also include a tubular outer part embracing the reinforcing member, but the invention may be applied where such outer part is omitted.

The term "hose" as used herein means any duct or pipe affording a bore along its interior along which fluid, either in gaseous or liquid form, can be passed.

Rubber or a plastics material are normally employed for the inner part and the outer part (where provided) of flexible reinforced hose of the kind specified, and the character of the curing treatment is dependent upon the composition of the material selected. Prior to curing the material is capable of being caused to flow under pressure, for example it can be formed into the tubular part required by extrusion, and is said to be in its "green" state; whereas after curing the material becomes shape-holding and, depending upon the composition of the material, may be elastic.

It is desirable to establish and to maintain a closely embracing relation between the tubular inner part and the filamentary material of which the reinforcing member is composed. When a hose formed by conventional methods is subjected to repeated flexure in the same or different directions, or is subjected to external stresses such as torsional stresses, for example upon assembly with a connecting fitting affording an annular socket for the reception of the hose, one wall of which may undergo relative rotation with respect to the other during tightening or clamping of the fitting onto the hose, the closely embracing relation between the tubular inner part and the reinforcing member, which may have been established during manufacture of the hose, may be disturbed. Such disturbance of the relation between the tubular inner part and the reinforcing member results in a diminution of reinforcement of the inner part and thus may lead to rupture of the hose in use.

It is an an object of the present invention to provide a new or improved flexible reinforced hose of the kind referred to and a method of manufacturing same such that the possibility of disturbance of a closely embracing relation which is established between the tubular inner part and the reinforcing member during manufacture is significantly reduced, as compared with conventional hoses.

Heretofore one method of producing flexible reinforced hose of the kind specified has been to extrude the tubular inner part concentrically with a flexible mandrel, and thereafter to apply a reinforcing member (consisting of a spiral winding of wire or braided sheath of wire) about lengths of the extruded inner part. Subsequently the resultant partly formed product, namely the inner part (uncured and with a length of mandrel still inside it) and the outer reinforcing member is passed through a further extrusion die in which an outer tubular part is extruded over the partly formed product. A temporary protective sheath of metal or wrapping of tape is then applied externally of the extruded outer tubular part. The partly formed product is then coiled with its sheath or wrapping in position to convert it into relatively compact form, as distict from extended form, and is then subjected to curing treatment consisting of immersion in a bath of a selected fluid heated to the requisite temperature, or to heating by a gaseous medium such as steam in an auto-clave.

Thereafter the protective sheath or wrapping is removed.

This method of manufacture has two main disadvantages.

One of these is that, owing to the multiplicity of operations involved, and more particularly to the necessity for providing a temporary outer sheath or wrapping and for coiling the material into compact form to permit it to be cured, the manufacturing cost is high.

Further, the method is intrinsically difficult to adapt for production by way of continuous flow or passage of the product along a production line, the sheathing or wrapping operation, and the coiling operation preparatory to curing, being obstacles to efficient organization for this type of production.

Furthermore, flexible reinforced hose produced by this method invariably exhibits a permanent set in the form of a longitudinal curvature due to its coiled attitude during the curing of the initially extruded inner tubular part. This is disadvantageous in many applications merely because of the physical inconvenience of installing lengths of hose which tend to assume a curvature along intended runs, channels, or in relation to other structure where straight runs are required.

There is also a less obvious disadvantage of this characteristic. The reinforcing member is normally in the form of a spiral winding of wire or a sheath of wire formed as a braid (that is to say composed of spiral runs of opposite hands interlocking or intermeshed with each other). When a piece of hose that has a permanent curvature is artificially straightened the individual filaments of the reinforcing member are displaced to a small extent, but definitely displaced, from their proper positions. The function of the reinforcing member is to enable the hose to withstand high internal fluid pressures and maintenance of the individual filaments of the reinforcing member in their proper positions is an important factor in ensuring that peak pressures can be withstood reliably. Displacement may alter the helix angle of a given filament and there is an optimum helix angle to achieve maximum reinforcing effect. In extreme cases adjacent filaments may be moved apart from each other leaving an unsupported gap which is a potential area of weakness in the hose.

SUMMARY OF THE INVENTION

From one aspect the present invention resides in a method of manufacturing flexible reinforced hose of the kind referred comprising the steps of extruding a non-metallic curable material in an uncured condition around a radially outwardly presented mandrel surface to form the tubular inner part, applying the reinforcing member presenting interstices about this inner part while the latter is still in an uncured condition, subjecting the inner part to curing treatment including raising its temperature, and expanding said surface radially relative to the reinforcing member while said curing treatment is applied to force some of said material outwardly into said interstices.

The term "uncured condition" as used herein and in the appended claims includes a condition in which no curing of the material has occurred, and a condition in which some degree of curing has occurred but the material is not completely cured. For example, some degree of curing may occur during extrusion of the inner part, if the temperature of the non-metallic material is temporarily elevated during the extrusion process. Such partially cured material is referred to herein as being "uncured."

Preferably the materials of which the mandrel and reinforcing member are respectively composed are selected to provide that radial expansion of the mandrel relative to the reinforcing member will occur if they are heated through the same temperature range, and the step of expanding the mandrel surface is affected solely by heating the assembly of the mandrel, the tubular inner part and the reinforcing member.

The effect of the radial expansion of the mandrel surface relative to the reinforcing member during the curing treatment is to force the non-metallic material of the inner tubular part radially outwardly into the interstices of the reinforcing member. This penetration of the material of the inner part into the reinforcing member is important in establishing and maintaining a closely embracing or surface keying relation between the inner part and the reinforcing member during use of the hose.

In a case where the flexible reinforced hose required to be manufactured includes also a tubular outer part, this would be applied over the reinforcing member while the inner part is in the uncured condition, and the whole assembly would then be subjected to curing treatment to effect curing of the inner and outer parts concurrently.

It is preferred that the diametral expansion of the mandrel relative to the reinforcing member be sufficient to cause material from the inner part to penetrate through the reinforcing member into contact with the outer part so that during the curing step the inner and outer parts become united by non-metallic material occupying the interstices of the reinforcing member and cured therein. However, it is undesirable for material from the inner part to be forced through the reinforcing member to such an extent that a blister or surface blemish is produced on the outer part.

A preferred feature of the method according to the present invention is that the step of curing the inner part, or curing both the inner and outer parts when the latter is present, be effected with the assembly arranged in extended, as distinct from coiled, form. By "extended form" is meant that a reference axis extending longitudinally and centrally of the partly formed hose shall be straight, or shall be in the form of a shallow curve such as a catenary curve consequent upon support of the partly formed hose as a catenary during the curing treatment.

In consequence of this, the hose produced by the method of the invention can be made free from any non-rectilinear set such as the curvature previously mentioned when conventional methods of manufacture are practiced.

Not only is this of great importance to users of the hose but also results in favorable disposition and conditions of stress of the filamentary material which forms the reinforcing member, ensuring that the latter is properly loaded and properly supports the inner part when the latter is subjected to high fluid pressures internally.

A further advantage of subjecting the partly formed hose to curing treatment while in extended form is that it is unnecessary to apply a supporting member, such as a metal sheath, to the partly formed hose to prevent damage to the latter during the curing treatment.

For the purpose of controlling flow of the material of the inner part radially outwardly during the curing treatment, a diffuser member may be applied about the inner part before or concurrently with application of the reinforcing member, so that the diffuser member lies between the inner part and the reinforcing member. The diffuser member may comprise a winding or braiding presenting pitch spaces or apertures of larger size than the interstices of the reinforcing member, and the presence of these pitch spaces or apertures tends to cause the outflowing material to be more uniformly disbursed than would otherwise be the case.

The method is susceptible to being practiced by way of continuous flow production. The mandrel may be formed of discrete lengths of rod-like material which are joined end-to-end preparatory to passage through the extrusion orifice through which the non-metallic material is extruded to form the inner part. Preferably, the locations of the joints between mandrel lengths are identified on the partly formed product at appropriate stages of the method, so that such joints can be located on the finished product and sections of the latter adjacent to such joints may then be cut out and discarded if so desired.

In carrying out the method by way of continuous flow production, it may be convenient to interrupt the flow between the steps of extruding the inner tubular part and of applying the reinforcing member thereto, since apparatus for winding or braiding filamentary material about the inner part may have a capability of operation as regards the product length produced in unit time which is less than that of the extrusion apparatus for forming the inner tubular part. Consequently a plurality of braiding heads may be required to absorb the output from a single extrusion apparatus.

In this case the extruded inner part and mandrel may be severed at the joint locations preparatory to the step of applying the reinforcing member, and thereafter individual lengths of the partly formed product may be reconnected to each other preparatory to passage through a further extrusion apparatus for applying the outer tubular part.

From a further aspect the present invention resides in the provision of a flexible reinforced hose to the kind referred to wherein the reinforcing member is formed of metal, and is keyed to the inner tubular part by material from the latter within interstices in the reinforcing member and cured therein.

BRIEF DESCRIPTION OF THE DRAWINGS

The invention will now be described, by way of example, with reference to the accompanying drawings, wherein:

FIG. 1 is a view in side elevation and partly in cross-section of one embodiment of a flexible reinforced hose in accordance with the invention and illustrating different stages in the manufacture thereof;

FIG. 2 is a view similar to FIG. 1 illustrating a further embodiment; and

FIG. 3 is a diagrammatic illustration showing a manner of practicing the method of the invention for continuous flow production.

DETAILED DESCRIPTION

Referring firstly to FIG. 1, the partly formed hose comprises a tubular inner part 10 which is composed of a non-metallic curable material extruded onto a mandrel 13.

Any of a number of selected materials may be employed for the inner part.

In general it is advantageous to select the composition to provide a controlled rate of curing such that there is no curing or very little curing during initial extrusion, but a high rate of curing during the application of the designed curing treatment after application of the reinforcing member and outer tubular part hereinafter described.

Typically the material of the inner part may be composed of:

(a) a butadiene acrylonitrile co-polymer;
(b) an inert filler material (generally a mineral filler material is employed for this purpose);
(c) reinforcing blacks (carbon) of selected particle sizes:
(d) plasticizers for extending or increasing the flowability of the uncured composition;
(e) curing agent (primarily sulphur based vulcanized agents);
(f) activators and accelerators for controlling the rate of the curing process.

Externally of the tubular inner part 10 is provided a reinforcing member. This may be a spiral winding or a sheath formed by a braiding process composed of wire filaments. In certain cases, and if desired, the filamentary material may be non-metallic. If metallic, it is selected to provide the required tensile strength and to be inert with respect to the constituents of the hose. Steel wire coated with a non-ferrous metal such as brass has been found to be satisfactory.

The hose further comprises a tubular outer part 12 externally embracing the reinforcing member.

The composition of the tubular outer part is selected preferably to have a higher curing rate than that of the tubular inner part, so that if the parts are raised to the same temperature for curing, the outer part will be completely cured before the inner part is completely cured. Typically the polymer material utilized may be polychloroprene which intrinsically provides a higher curing rate than the corresponding constituent of the material employed for the inner part. The other constituents may be equivalent to those already specified for the inner part. The high rate of curing is desired in respect of the outer part to minimize the risk of surface blemishes by contact with any mechanical part, such as a tubular housing hereinafter mentioned, or emergence of the extrusion from the extrusion orifice.

In certain cases the high rate of curing in respect of the outer part may also minimize the risk of surface blemishes being formed by penetration of excessive amounts of material from the inner part through interstices of a localized area of the reinforcing member thus displacing the outer part slightly away from the reinforcing member.

In the left-hand half of FIG. 1, designated A, the component parts of the hose are shown diagrammatically in their positional relationships which exist prior to subjection to the curing treatment, and it will be noted that there is shown a distinct radical space or gap between the outer boundary of the inner tubular part and the inner boundary of the outer tubular part, this gap or space being occupied by the filaments of the reinforcing member 11, the effective diameter of which, measured by a center line passing through the centers of these filaments, has a diameter $a$.

It will be understood that the gap or annular space has been exaggerated for the purpose of clarity and there may be some penetration of both the inner tubular part and the outer tubular part into the interstices between the wires of the reinforcing member prior to subjection to the curing treatment.

Preparatory to subjection of the assembly to the curing treatment, the mandrel 13 which defines the internal boundary of the inner tubular part has a diameter $b$.

In the right-hand half of FIG. 1, designated B, there is shown the positional relationship of the parts of which the hose is composed during and after the curing treatment.

The curing treatment, which is described hereinafter in greater detail, involves raising the temperature of the assembly. Both the mandrel 13 and the reinforcing member 11 expand radially as a consequence of the increase in temperature. The respective materials of which the mandrel and reinforcing member are formed are selected to provide that, for a given increase in temperature, the mandrel will expand radially relatively to the reinforcing member. The state of the assembly after its temperature has been raised is illustrated in FIG. 1B. The initial or cold diameter of the mandrel is indicated at $b$, the new diameter of the mandrel is indicated at $c$ and the new diameter of the reinforcing member is indicated at $d$. The difference between $b$ and $c$ is significantly greater than the difference between $a$ and $d$.

The effect of the relative expansion of the mandrel is to force material of the inner part 10 into the interstices of the reinforcing member 11. Some material may be forced completely through the interstices and make contact with the material of the outer part 12.

If the composition of the inner and outer parts is compatible, bonding may be effected between these parts during the curing step.

After curing of the inner and outer parts 10 and 12, the assembly is cooled and both the mandrel 13 and the reinforcing member 11 return to their respective original diameters. The material from the inner part which has been forced into interstices in the reinforcing member remains therein and the inner tubular part may fit rather less tightly about the mandrel after cooling than before and during curing.

In FIG. 2 parts corresponding to those already described are designated by like reference numerals with the prefix 1 and the preceding description is to be deemed to apply thereto.

In this second embodiment, however, in addition to the reinforcing member 111, there is provided externally of the inner part 110 and between this and the reinforcing member a diffuser member 114 which consists of a winding of filamentary material which presents larger pitch spaces 115 than the interstices presented by the reinforcing member 111, or alternatively comprises a sheath formed by a braiding operation and presenting apertures which are larger than the interstices presented by the reinforcing member.

In the transition from the positional relationships illustrated in section A of FIG. 2 to section B of FIG. 2, resulting from an increase in the temperature of the assembly, material from the inner part 110 has to pass through the pitch spaces 115 of the diffuser member 114 and in doing so tends to become dispersed more evenly relative to the inwardly presented face of the reinforcing member 114. The general effect is, therefore, to distribute this material evenly with respect to the interstices and there is less likelihood of excessive penetration of the material through the reinforcing member which, if it occurred excessively in any localized area, could give rise to a break-through blister or blemish which would be visible at the external surface of the outer tubular part 12.

Referring now to the particular method of practicing the invention which is illustrated diagrammatically in FIG. 3, although the method involves continuous flow production, it is found convenient for discrete mandrel lengths to be employed and for these to be joined end-to-end to form a continuous mandrel. To enable mandrel lengths to be joined readily and subsequently separated again, we provide each mandrel length with a core of metal wire which extends along a center line of each mandrel length. The part of the mandrel surrounding the core may be formed of polypropylene or of nylon.

Mandrel lengths which have been removed from completed pieces of hose are connected end-to-end by means of connectors which are crimped onto the metal cores of the mandrel lengths, or by means of welding together the metal cores. The continuous mandrel 13 thus formed is fed in any suitable manner, for example by means of driven feed rollers 14 into the extrusion chamber of extrusion apparatus 17 which is supplied with the required composition of non-metallic material to form the tubular inner part 10. The latter is extruded about the mandrel 13 and the assembly of mandrel and inner part emerge from the extrusion orifice of the apparatus 17 into a channel 18. The channel 18 may be of open-topped form and arranged horizontally. It is fed with a cooling fluid such as water entering an inlet 19 and emerging from an outlet 20. Although not shown in the diagrammatic drawing, an extruded product may contact the interior surface of the channel 18 without detriment to the surface of the extruded product and the buoyancy resulting from the cooling fluid within the channel will provide distributed support to the extruded product, any contact with the channel will involve only light contact pressure.

If required, the channel 18 may be inclined downwardly away from the extrusion apparatus 17 and a lower part only of the channel may contain cooling fluid. This would avoid extrusion difficulties arising from uneven temperature distribution in the extrusion orifice owing to the whole or a part of the orifice being submerged within the cooling fluid.

Upon emergence from the channel 18 the extruded product may be subjected to a marking operation by a marking device 21 operated to identify on the exterior surface the location of joints between discrete mandrel lengths. The marking device may apply a marking medium to the surface of the extruded product, or may deform the extruded product locally in the region of a mandrel joint.

The assembly comprising the mandrel 13 and inner part 10 may then pass directly to apparatus for applying the reinforcing member 11. However, generally it will be more convenient to store the assembly temporarily after emergence from the channel 18. In many cases the apparatus for applying the reinforcing member will be capable of handling the assembly at a rate which is only a fraction of the rate at which the inner part is extruded by the apparatus 17. Accordingly, it is convenient to provide several braiding machines for applying the reinforcing member to the product of a single extrusion apparatus. At the storage station C indicated in FIG. 3 the assembly may be stored in coiled form, for example on reels, or otherwise.

It will be understood that at this stage the inner tubular part has not undergone any curing and consequently temporary storage in coiled form does not impart any permanent curvature to the assembly.

For the purpose of storing the assembly and of feeding the assembly to several braiding machines, the assembly emerging from the channel 18 may be severed at joints marked by the device 21 either into lengths corresponding to single mandrel lengths, or into somewhat longer pieces corresponding to several mandrel lengths.

After storage, or directly from the channel 18 and marker 21 if temporary storage of the assembly does not occur at this stage, the assembly comprising the mandrel 13 and inner part 10 is passed to a braiding apparatus 23 for application of the reinforcing member 11. However, before the reinforcing member can be applied to the surface of the uncured inner part 10, the latter must be subjected to conditioning treatment to render it sufficiently firm to enable the assembly to be passed through a braiding head and for the reinforcing member to be applied under tension without displacement of the material of the inner part to any significant extent.

For this purpose the assembly is fed through a heat exchanger 22 which forms a part of the braiding apparatus 23. The heat exchanger comprises a chamber to which a cooling fluid, preferably a gas, is supplied. The chamber is provided with apertures through which the assembly can enter and leave the chamber, these apertures being provided with sealing means which minimize the loss of cooling fluid.

With an inner part 10 composed of the materials mentioned above, the surface of the inner part will be sufficiently firm for the braiding operation if its temperature is maintained within a range from −60° C. to −95° C. It will be appreciated that it is not necessary for the entire assembly comprising the mandrel 13 and inner part 10 to be cooled to this temperature, but sufficient heat must be removed from the inner part 10 and the mandrel to avoid heat flowing radially outwardly to the surface of the inner part at a rate sufficient to raise the temperature of the surface of the inner part above the range previously mentioned. Typically the surface of the inner part 10 is at a temperature of −80° C. when the assembly passes out of the heat exchanger.

From the heat exchanger 22 the assembly of mandrel 13 and inner part 10 is passed through a braiding head 24 which applies wire filaments to form a braided sheath constituting the reinforcing member 11.

If a diffuser member, as described with reference to FIG. 2, is to be applied, the apparatus 23 may include a further rotary head (not shown) for winding a wire or other filamentary element about the inner part 10 prior to application of the reinforcing member 11.

The discrete lengths of the assembly which leave the braiding apparatus 23 may subsequently be joined end-to-end to provide a continuous assembly which is fed to a further extrusion apparatus 26. Such joining of the assembly may be effected by welding or crimping together ends of the core of the mandrel lengths. The apparatus 26 is supplied with non-metallic curable material for forming the tubular outer part 12. This is extruded about the reinforcing member 11 and the assembly which emerges from the extrusion orifice of the apparatus 26 passes directly into a tubular housing 27 within which the assembly is subjected to curing treatment.

A portion of the housing 27 adjacent the extrusion apparatus 26 is shaped as a catenary curve and a further part of the housing remote from the apparatus 26 may be rectilinear and preferably is inclined downwardly away from the apparatus 26. The assembly comprising the uncured hose is supported as a catenary within the curved portion of the housing 27 and lies on the bottom of the rectilinear portion of the housing.

A heating medium is supplied to the housing 27 for the purpose of raising the temperature of the uncured hose sufficiently to promote curing. This heating medium may be superheated water and the housing 27 may be filled with superheated water maintained under pressure and circulated through the housing 27. Alternatively, the heating medium may be superheated steam, in which case a higher part of the housing 27 would be occupied by steam and conveniently a lower part of the housing would be occupied by water at a temperature somewhat lower than that of the steam. By way of example, the housing illustrated in FIG. 3 is provided with a steam inlet 28 adjacent to the extrusion apparatus 26, and a steam outlet 29 at a position spaced a short distance from the lower end of the housing. A water inlet 30 is provided adjacent the lower end of the housing 27 and a water outlet 31 is positioned adjacent the steam outlet 29. The length of the housing is of the order of 100 meters and when the hose reaches the region above the steam outlet 29 both the inner part 10 and the outer part 12 are fully cured.

The hose is cooled as it passes through the water at the lower end of the housing 27 so that upon emergence from the latter the hose is sufficiently cool for further handling.

Alternatively, in a case where the hose emerges from the housing 27 too hot for further handling, for example in a case where the whole of the housing 27 is occupied by superheated water, the hose may be passed from the housing 27 to a cooling trough similar to the channel 18.

The positions of mandrel joints may be marked on the reinforcing member 11 by a further marking device 25 positioned downstream of the braiding apparatus 23. Similarly, the position of mandrel joints may be marked on the outer part 12 by a marking device 32 positioned adjacent the lower end of the housing 27.

The cured hose would be passed to a cutter 33 which is operated to cut out portions of the hose including the mandrel joints to avoid inclusion in the finished product of hose portions of non-uniform structure.

The mandrel length is subsequently expelled from each piece of hose in a conventional manner by applying hydraulic pressure to one end. It will be apparent that the mandrel lengths can be reused.

As previously described, the mandrel 13 expands diametrally relative to the reinforcing member 11 when the assembly is subjected to heating within the housing 27. The outer part 12 is cured sufficiently while the assembly is supported as a catenary in the upper portion of the housing 27 to avoid damage to the surface of the hose when the latter comes into contact with the bottom of the lower portion of the housing. It will be apparent that it is unnecessary to apply any wrapping or supporting member about the uncured hose for the purpose of avoiding damage to the surface of the latter during curing, as is the case in processes where curing is carried out with the hose in coiled form.

What is claimed is:

1. A method of manufacturing flexible reinforced hose comprising the steps of:
   (a) providing a mandrel formed of a material which expands radially when its temperature is raised,
   (b) extruding a non-metallic curable material in an uncured condition onto a radially-outwardly presented surface of said mandrel to form a tubular inner part supported internally by said mandrel,
   (c) applying a reinforcing member presenting interstices about this inner part while the latter is still in an uncured condition, said reinforcing member being formed of material selected to provide that the coefficient of thermal radical expansion of the reinforcing member is less than that of the mandrel,
   (d) extruding further curable material in an uncured condition about said reinforcing member to form a tubular outer part comprising a single layer outside the reinforcing member,
   (e) suspending the mandrel, uncured inner parts, reinforcing member and uncured outer part in a heating chamber with the outer surface of said uncured outer part free from contact with any supporting surface within the heating chamber,
   (f) subjecting the inner and outer parts while in the heating chamber to curing treatment including contacting the outer surface of said outer part directly with a heating medium from which heat is transferred to the outer and inner parts, and
   (g) during at least a part of the period for which heat is transferred to the outer part, raising the temperature of said mandrel to expand said surface radially relative to the reinforcing member to force some of said curable material into said interstices.

2. A method according to claim 1 wherein before the reinforcing member is applied to the extruded inner part, at least an outer surface layer of the latter is cooled to a temperature below the ambient temperature.

3. A method according to claim 1 wherein the inner and outer parts are subjected to curing treatment while the mandrel, tubular inner part, reinforcing member and tubular outer part are suspended as a catenary from two positions between which the assembly is free from contact with any supporting surfaces.

4. A method according to claim 1 wherein a diffuser member comprising a winding or braiding presenting pitch spaces or apertures of larger size than interstices which exist in the reinforcing member is applied about the inner part to lie between the inner part and the reinforcing member.

5. A method according to claim 1 wherein the mandrel comprises sections which are joined end-to-end before the inner part is extruded around the mandrel, and which are separated one from another after curing of the tubular inner part and of the tubular outer part, if provided, the mandel sections then being expelled from the completed hose.

6. A method according to claim 1 wherein the respective temperatures of the mandrel and the inner tubular part are raised by applying heat to the exterior of the unfinished hose only, and thereby causing heat to be conducted inwardly towards the mandrel.

7. A method according to claim 3 wherein said mandrel is formed of material selected to provide that the mandrel is sufficiently flexible to be wound into a coil, and wherein between the steps of extruding said inner tubular part and subjecting same to curing treatment, said assembly is wound onto a coil and subsequently unwound therefrom into extended form.

8. A method according to claim 1 wherein said tubular inner part is formed by extruding an unvulcanized rubber composition.

9. A method according to claim 1 wherein said reinforcing member is so applied as to extend over a greater proportion of the outer surface of the inner tubular part than do said interstices presented by the reinforcing member.

10. A method according to claim 1 wherein the inner and outer parts are subjected to curing treatment while the assembly comprising the mandrel, tubular inner part, reinforcing member and tubular outer part is arranged in extended form and is suspended between two positions between which the assembly is free from contact with any supporting surfaces and wherein during said curing treatment said assembly is passed continuously through a heating chamber having a length less than that of said assembly, so that at any moment only a part of the assembly disposed within the heating chamber is being subjected to said curing treatment.

11. A method of manufacturing flexible reinforced hose comprising the steps of:
   (a) providing a mandrel formed of a material which expands radially when its temperature is raised,
   (b) extruding a non-metallic curable material in an uncured condition onto a radially-outwardly presented surface of said mandrel to form a tubular inner part supported internally by said mandrel,
   (c) applying a reinforcing member presenting interstices about this inner part while the latter is still in an uncured condition, said reinforcing member being formed of material selected to provide that the coefficient of thermal radial expansion of the reinforcing member is less than that of the mandrel,
   (d) passing the mandrel, inner part and reinforcing member through extrusion means into a heating chamber,
   (e) extruding a curable material in an uncured condition from said extrusion means directly into said heating chamber in such a manner as to form a tubular outer part of the hose surrounding and in contact with said reinforcing member,
   (f) suspending the uncured hose and the mandrel as a catenary within the heating chamber between said extrusion means and a support position remote therefrom, (g) maintaining in the hose passing through the heating chamber a tension such that the exterior of the uncured outer part is maintained free from contact with any supporting surface between said extrusion means and said support position,
(h) continuously drawing the hose from the heating chamber,
(i) subjecting the inner and outer parts to curing treatment including raising their respective temperatures simultaneously while they move continuously through said heating chamber at a speed such that the outer part is cured before reaching said support position, and
(j) during at least a part of the period for which the temperature of the outer part is being raised, raising the temperature of said mandrel to expand said surface of the mandrel relative to the reinforcing member to force some of said curable material of the inner part into said interstices.

References Cited

UNITED STATES PATENTS

| | | | |
|---|---|---|---|
| 2,714,414 | 8/1955 | Ganahl et al. | 156—171 |
| 3,168,910 | 2/1965 | Galloway et al. | 156—143 |
| 2,730,762 | 1/1956 | Ballard | 156—143 |
| 132,006 | 10/1872 | Harris | 156—144 |
| 2,822,857 | 2/1958 | Rothermel et al. | 156—144 |
| 2,909,417 | 10/1959 | Osenberg | 264—DIG. 50 |
| 3,274,316 | 9/1966 | Songer | 156—171 X |
| 2,461,594 | 2/1949 | Flounders | 156—143 |
| 3,062,241 | 11/1962 | Brumback | 156—143 |
| 3,414,448 | 12/1968 | Harper | 156—149 |
| 3,231,442 | 1/1966 | Michael | 156—175 X |
| 459,536 | 9/1891 | Simon | 156—149 |
| 3,519,520 | 7/1970 | Newman, Jr. | 156—173 X |
| 3,684,602 | 8/1972 | Ball | 156—149 |

OTHER REFERENCES

Modern Plastics Encyclopedia, 1948, insert—Plastics Properties Chart (lower right corner section).

CLIFTON B. COSBY, Primary Examiner

U.S. Cl. X.R.

64—2 R; 156—149, 175